(12) United States Patent
Wada et al.

(10) Patent No.: US 7,079,456 B2
(45) Date of Patent: Jul. 18, 2006

(54) OPTICAL RECORDING HEAD CAPABLE OF CORRECTING SPHERICAL ABERRATION

(75) Inventors: Hidenori Wada, Uji (JP); Yasuhiro Tanaka, Ashiya (JP); Hideki Hayashi, Nara (JP); Sadao Mizuno, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 480 days.

(21) Appl. No.: 10/613,672

(22) Filed: Jul. 3, 2003

(65) Prior Publication Data
US 2004/0004913 A1    Jan. 8, 2004

(30) Foreign Application Priority Data
Jul. 4, 2002    (JP)    ............... 2002-195487

(51) Int. Cl.
*G11B 7/95*    (2006.01)
(52) U.S. Cl. ................ 369/44.23; 369/112.23
(58) Field of Classification Search ............ None
See application file for complete search history.

(56) References Cited

U.S. PATENT DOCUMENTS

| | | | |
|---|---|---|---|
| 6,115,336 A | 9/2000 | Okada | |
| 6,201,229 B1 | 3/2001 | Tawa et al. | |
| 6,498,330 B1 | 12/2002 | Yoshida | |
| 6,781,945 B1 * | 8/2004 | Ogata | 369/112.23 |

FOREIGN PATENT DOCUMENTS

| | | |
|---|---|---|
| JP | 10-334575 A | 12/1998 |
| JP | 11-258544 A | 9/1999 |
| JP | 2000-171346 A | 6/2000 |

* cited by examiner

*Primary Examiner*—Thang V. Tran
*Assistant Examiner*—Joseph Haley
(74) *Attorney, Agent, or Firm*—Hamre, Schumann, Mueller & Larson, P.C.

(57) ABSTRACT

An optical element having a high capture efficiency and rim intensity is provided. The optical element includes a central axis, a first curved surface extending in the transverse direction with respect to the central axis, a second curved surface extending in the transverse direction with respect to the central axis, and a peripheral surface extending between the first curved surface and the second curved surface. Light is refracted from the time light is incident on the first curved surface to the time the light is emitted from the second curved surface. Thereby, a light intensity distribution of the light emitted from the second curved surface and a light intensity distribution of the light incident on the first curved surface are different from each other, and a rim intensity improvement rate R, which is a rate of the rim intensity of the emitted light with respect to the rim intensity of the incident light is 1.07 or more and 1.5 or less, in which the rim intensity represents a ratio of the central intensity to the peripheral intensity.

22 Claims, 7 Drawing Sheets

| Rim Intensity Improvement Rate | | R | K | a1 | a2 | a3 | a4 | a5 |
|---|---|---|---|---|---|---|---|---|
| 1.5 | First Curve Surface | -28.6253 | -1 | 0.005138 | 7.04E-05 | -2E-05 | 2.32E-06 | -1.6E-07 |
| | Second Curve Surface | 30.51579 | -1 | 0.003795 | 0.000219 | 0.000104 | -2.5E-05 | 5.7E-06 |
| 1.3 | First Curve Surface | -52.1811 | -1 | 0.00289 | 0.000135 | -8.4E-06 | 1.07E-06 | -1.3E-07 |
| | Second Curve Surface | 21.38189 | -1 | 0.002414 | 0.000159 | 5.02E-05 | -9E-06 | 2.16E-06 |
| 1.1 | First Curve Surface | -516.948 | -1 | 0.000779 | 9.34E-05 | -1.7E-06 | 1.63E-06 | -1.7E-07 |
| | Second Curve Surface | 15.82058 | -1 | 0.000712 | 7.7E-05 | 1.27E-05 | -3.6E-07 | 2.38E-07 |
| 1.07 | First Curve Surface | 1412.483 | -1 | 4.72E-04 | 7.88E-05 | -1.82E-05 | 1.78E-06 | -1.69E-07 |
| | Second Curve Surface | 45.1872 | -1 | 4.17E-04 | 6.34E-05 | 7.78E-06 | 6.54E-07 | 4.73E-08 |
| 1.05 | First Curve Surface | 388.6327 | -1 | 0.000272 | 6.79E-05 | -2.1E-06 | 1.85E-06 | -1.7E-07 |
| | Second Curve Surface | 14.76564 | -1 | 0.000217 | 5.43E-05 | 4.72E-06 | 1.28E-06 | -6.4E-08 |

OPTICAL RECORDING HEAD CAPABLE OF CORRECTING SPHERICAL ABERRATION

FIELD OF THE INVENTION

The present invention relates to an optical element used in optical information processing or optical communications, etc., an optical head, a method for correcting a spherical aberration, and an optical recording/reproducing apparatus.

BACKGROUND OF THE INVENTION

In recent years, the digital versatile disc (DVD) has been attracting attention as a large capacity optical recording medium since it can record digital information at a recording density about six times higher than that of the compact disc (CD). However, in accordance with the increase in capacity of information, higher density optical recording media have been demanded. In order to achieve higher density than DVD (wavelength: 660 nanometers (nm) and numerical aperture (NA): 0.6), it is necessary to shorten the wavelength of a light source and to increase the NA of the objective lens. For example, when a blue laser with the wavelength of 405 nm and an objective lens having the NA of 0.85 are used, a recording density five times higher than that of DVD can be achieved. Furthermore, by making a recording layer of an optical recording medium to have two-layered structure, the recording capacity becomes an additional two times higher than that of DVD.

However, in the high-density optical recording medium using the above-mentioned blue laser, in order to increase the recording capacity, the track pitch becomes quite narrow. Therefore, in order to make the tracking error signal stable, it is necessary to increase the rim intensity, i.e., a ratio of the central intensity to the peripheral intensity of light with which an optical recording medium is irradiated. The rim intensity can be increased by using only the central portion of light emitted from a light source. However, the use efficiency (capture efficiency) of light emitted from the light source decreases. Therefore, in order to record information in the optical recording medium, it is necessary to use a light source capable of outputting a large amount of light. Furthermore, in order to record information in a multi-layered optical recording medium, a light source capable of outputting an even larger amount of light is necessary. However, a light source capable of outputting an even large amount of light has a problem in lifetime and yield is bad. Therefore, an optical element having the large rim intensity and still having high capture efficiency is proposed in JP11 (1999)-258544A.

Figure 10:
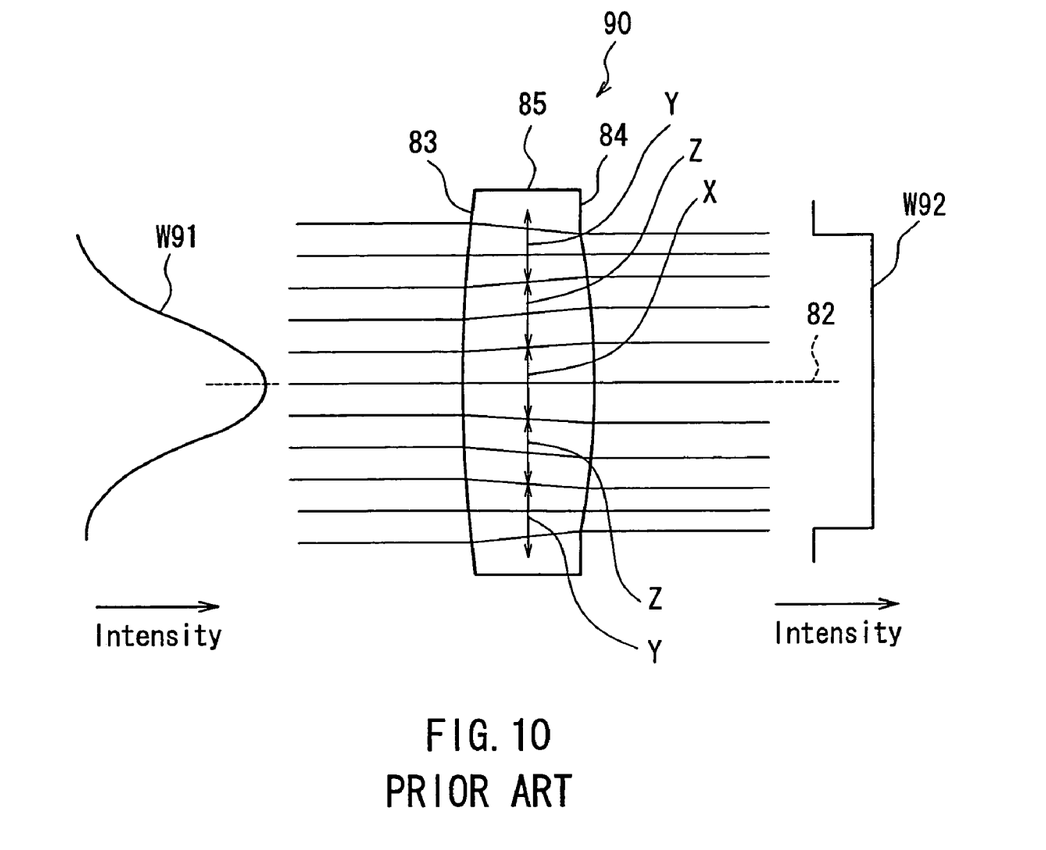
FIG. 10 is a view to explain a configuration of a conventional optical element.

FIG. 10 is a view to explain a configuration of a conventional optical element 90. The optical element 90 includes a first curved surface 83 formed at the side on which light is incident, a second curved surface 84 formed at the side from which light is emitted. The first curved surface 83 and the second curved surface 84 are formed along the surface substantially perpendicular to a central axis line 82, and a peripheral surface 85 is formed so that it connects between the first curved surface 83 and the second curved surface 84 along the direction parallel to the central axis 82. Furthermore, FIG. 10 shows a large number of optical paths of rays of light, passing through the conventional optical element 90 while being refracted, as a plurality of bent lines. The optical element 90 is made of a transparent material (for example, glass) having an isotropic refractive index.

The operation of the thus configured optical element 90 will be explained. The light incident on the first curved surface 83 diverges due to the refraction at the first curved surface 83 in one region inside the optical element 90, and converges in another region of the optical element 90. Therefore, light is emitted through the curved surface 84 with a light intensity distribution that is different from the light intensity distribution of the incident light.

Specifically, in a region Z, light paths of rays of light passing through the optical element 90 extend in parallel to each other. In the central region X at an inner side of the region Z, rays of light diverge. In the peripheral region Y at an outer side of the region Z, rays of light are converged.

Therefore, as shown in the Gaussian luminous intensity distribution W91 shown in the left side of FIG. 10, rays of light with a high intensity located in the central part diverge in passing through the optical element 90, and the intensity thereof is lowered when they are emitted from the optical element 90. In the Gaussian luminous intensity distribution W91, rays of light with a low intensity located at peripheral parts converge in passing through the optical element 90, and the intensity thereof is increased when they are emitted from the optical element 90. Thus, incident light having the Gaussian luminous intensity distribution W91 is converted into emitted light having a uniform luminous intensity distribution W92 as a whole by passing through the optical element 90.

If the thus configured optical element 90 is mounted on an optical head, since it is possible to improve the capture efficiency and to increase the rim intensity, a stable tacking error signal can be achieved with respect to a high density optical recording medium. Furthermore, it is possible to use a light source emitting a small amount of light.

However, when the thus configured light element 90 is mounted on the optical head, strict mounting accuracy is required. Therefore, it is difficult to fabricate an optical head and furthermore, the reliability of the optical head becomes a significant problem. This will be mentioned in detail.

When a divergence angle of a light source is 25°, a focal distance of a collimator lens for taking light emitted from the light source and collimating the emitted light into substantially parallel light is 6.7 millimeters (mm), the diameter of light incident in the optical element is 2.84 millimeters (mm), and the central thickness of the optical element 90 is 1.5 millimeters (mm), the shapes of the first curved surface 83 and the second curved surface 84 are designed so that the rim intensity is increased from 52% to 100%. Then, when the optical element that satisfies these conditions is mounted on the optical head, the optical head 90 may tilt at about 0.1° as a mounting accuracy.

When calculating the case where the optical element 90 designed based on the above-mentioned conditions tilts at 0.1°, since as much as 350 m$\lambda$ of third-order coma aberration occurs, it is not possible to fabricate the optical head. Furthermore, even if the optical head is fabricated by completely adjusting so as not to tilt, such a large aberration as about 0.1° occurs, and it is not possible to secure the reliability of an optical head.

Furthermore, there is also a problem about decentering between the first curved surface 83 and the second curved surface 84 of the optical element 90 itself. When this optical element 90 is molded, 5 micrometers (μm) of decentering may occur with respect to the accuracy of die for molding. Therefore, when the decentering between the first curved surface 83 and the second curved surface 84 of the optical element 90 is 5 micrometers (μm), 100 m$\lambda$ of coma aberration occurs. As a result, it is not possible to mount the optical element 90 on the optical head, and thus the yield of the optical element 90 is deteriorated.

With the foregoing in mind, it is an object of the present invention to provide an optical element having the high capture efficiency and high rim intensity, an optical head, a method for correcting a spherical aberration and an optical recording/reproducing apparatus.

SUMMARY OF THE INVENTION

The optical element according to the present invention includes a central axis, a first curved surface extending in the transverse direction with respect to the central axis, a second curved surface extending in the transverse direction with respect to the central axis, and a peripheral surface extending between the first curved surface and the second curved surface. Light is refracted from the time light is incident on the first curved surface to the time the light is emitted from the second curved surface. Thereby a light intensity distribution of the light emitted from the second curved surface and a light intensity distribution of the light incident in the first curved surface are different from each other, and a rim intensity improvement rate R, which is a ratio of the rim intensity of the emitted light with respect to the rim intensity of the incident light, is 1.07 or more and 1.5 or less, in which the rim intensity represents a ratio of the central intensity to the peripheral intensity.

The optical head according to the present invention is an optical head for recording or reproducing a signal with respect to an optical recording medium and including a light source for emitting light, and an objective lens for converging the light emitted from the light source on the optical recording medium. An optical element as described above is disposed between the light source and the objective lens.

In a method for correcting a spherical aberration according to the present invention, an optical head according to the present invention is used and the method includes: detecting a deviation of the thickness of a base material of the optical recording medium from the standard value, and changing a space between the optical element and the lens in order to correct the spherical aberration based on the detected deviation of the base material.

The optical recording/reproducing apparatus according to the present invention includes the optical head according to the present invention, and a processing circuit provided for controlling the position of the objective lens provided in the optical head so that the light is converged on a desired track on the optical recording medium based on a focus error signal and a tracking error signal produced by the optical head.

DESCRIPTION OF THE PREFERRED EMBODIMENTS

In the optical element according to the embodiment of the present invention, a rim intensity improvement rate R, which is ratio of the rim intensity of incident light to the rim intensity of emitted light is 1.07 or more and 1.5 or less intensity. The rim intensity represents a ratio of the central intensity to the peripheral intensity. Therefore, an aberration that occurs when the optical element tilts and an aberration that occurs when the first curved surface and the second curved surface are decentered can be suppressed to 70 mλ or less. As a result, the yield of the optical element is improved and when the optical element is mounted on the optical head, the yield of the optical head is improved and thus the reliability is improved.

In the embodiment, it is preferable that when a distance (central thickness) between the central position of the first curved surface and the central position of the second curved surface is d (mm), d satisfies the following relationship:

$$d \geq 54 \cdot R^4 - 221 \cdot R^3 + 304 \cdot R^2 - 138 \cdot R.$$

Thus, the aberration that occurs when the optical element tilts and the aberration that occurs when the first curved surface and the second curved surface are decentered can be suppressed to 70 mλ or less. Therefore, the yield of the optical element is improved and when it is mounted on the optical head, the yield of the optical head is improved and thus the reliability is improved.

In the optical head of the embodiment, the optical element of the embodiment is placed between the light source and the object lens. Therefore, the aberration that occurs when the optical lens tilts and the aberration that occurs when the first curved surface and the second curved surface are decentered can be suppressed to 70 mλ or less. As a result, the yield of the optical element mounted on the optical head is improved and the yield of the optical head is improved and thus the reliability is improved.

In this embodiment, it is preferable that the optical head further includes a spherical aberration correction means provided for correcting a spherical aberration that occurs due to a deviation of the thickness of a base material of the optical recording medium from the standard value. Thus, since the spherical aberration is corrected, a stable reproducing signal or control signal can be obtained, and stable recording and reproduction can be realized.

It is preferable that the optical head further includes a lens disposed at a predetermined space with respect to the optical element, wherein the spherical aberration correction means includes the lens, the optical element and a space changing means for changing a space between the optical element and the lens in order to correct the spherical aberration. Thus, since the spherical aberration correction means has a rim intensity improvement function, the tracking error signal can become stable. Furthermore, since the spherical aberration correction means has both the spherical aberration correction function and the rim intensity improvement function, the optical head can be miniaturized.

It is preferable that the lens converts light diverged by the optical element into parallel light. Thus, since the optical element having the rim intensity improvement function is located nearer to the side of the light source than the lens, when the space between the optical element and the lens is changed in order to correct the spherical aberration, the rim intensity improvement rate is not changed.

It is preferable that the optical head further includes a beam shaping optical element disposed between the optical element and the light source for beam-shaping of the light emitted from the light source. Thus, since the optical element becomes symmetrical with respect to the center, the yield of the optical element is increased, thus lowering the cost of the optical head. Furthermore, since the optical element of the present invention can be incorporated into the optical head regardless of the rotation direction, the yield of the optical head is increased. Furthermore, since the characteristic of the optical head is not dependent on the rotation direction of the optical element of the present invention, the reliability is improved.

It is preferable that when a distance (central thickness) between the central position of the first curved surface and the central position of the second curved surface is d (mm), d satisfies the following relationship:

$$d \geq 54 \cdot R^4 - 221 \cdot R^3 + 304 \cdot R^2 - 138 \cdot R.$$

Thus, the aberration that occurs when the optical element tilts and the aberration that occurs when the first curved surface and the second curved surface are decentered can be suppressed to 70 mλ or less. Therefore, the yield of the optical element is improved and when it is mounted on the optical head, the yield of the optical head is improved, and the reliability is improved.

It is preferable that the lens includes a convex lens disposed at the side of the optical element and a concave lens disposed at the side of the objective lens and having an Abbe constant that is smaller than an Abbe constant of the convex lens. Thus, it is possible to configure a spherical aberration correction means and further to correct a chromatic aberration. Furthermore, the transmittance efficiency of the optical element is high, and thus the use efficiency of the light from the light source is high.

It is preferable that the spherical aberration correction means is an expanding system. It is advantageous because when a space between the positive lens group and the negative lens group is changed in order to correct a spherical aberration, the rim intensity improvement rate is not changed.

It is preferable that the spherical aberration correction means has a chromatic aberration correction function. It is advantageous because the optical head can be miniaturized.

It is preferable that at least one of the optical element and the lens has a chromatic aberration correction function. It is advantageous because if either the optical element or the lens has a chromatic aberration correction function, the chromatic aberration of light can be corrected.

It is preferable that the spherical aberration correction means comprises the optical element, a diffractive lens disposed at a predetermined space with respect to the optical element, and a space changing means for changing a space between the optical element and the diffractive lens in order to correct the spherical aberration. Thus, the weight of a movable part is reduced and the mechanism part for moving a lens is facilitated. Furthermore, an electric current for moving the movable part can be reduced, thus saving energy.

It is preferable that the diffractive lens converts light diverged by the optical element into parallel light. Thus, since the optical element having the rim intensity improvement function is located nearer to the side of the light source than the diffractive lens, when the space between the optical element and the diffractive lens is changed in order to correct the spherical aberration, the rim intensity improvement rate is not changed.

It is preferable that the optical head further includes a chromatic aberration correction element having a chromatic aberration correction function. Thus, the chromatic aberration is corrected, so that defocus that occurs when the reproducing operation is switched to the recording operation or when the recording operation is switched to the reproducing operation is disappeared, and stable recording and reproduction can be realized.

It is preferable that the NA of the objective lens is 0.7 or more. Thus, it is possible to realize an optical head capable of recording and reproduction of a high-density optical recording medium.

It is preferable that the wavelength of the light emitted from the light source is 380 nanometers (nm) or more and 420 nanometers (nm) or less. Thus, it is possible to realize an optical head capable of recording and reproduction of a high-density optical recording medium.

It is preferable that the optical head further includes a deviation detector for detecting a deviation of the thickness of a base material of the optical recording medium from the standard value. Thus, it is possible to detect the deviation from the standard value quickly without leaning, and the optical head can be controlled for a short time.

It is preferable that the optical head further includes a lens disposed at a predetermined space with respect to the optical element; and a deviation detection means for detecting a deviation of the thickness of a base material of the optical recording medium from the standard value. The spherical aberration correction means includes the lens, the optical element and a space changing means for changing a space between the lens and the optical element in order to correct the spherical aberration based on the detected deviation of the base material. Thus, the spherical aberration can be corrected, and stable recording and reproduction can be realized.

In the method for correcting a spherical aberration of the embodiment, based on the detected deviation of the thickness of a base material, the space between the optical element and the lens is changed so as to correct the spherical aberration. Thus, the spherical aberration can be corrected, and stable recording and reproduction can be realized.

In changing the space, the lens is moved in order to change the space between the optical element and the lens.

This is because the optical element is extremely sensitive to the tilt, so that stable spherical aberration correction can be realized by moving the lens.

In the optical recording/reproducing apparatus of this embodiment, the optical head according to this embodiment is provided. Thus, the tracking error signal becomes stable and it is possible to configure the optical recording/reproducing apparatus capable of recording and reproducing information in a highly reliable optical recording medium. Furthermore, since the optical head is suitably miniaturized, the optical recording/reproducing apparatus is also miniaturized.

Hereinafter, the embodiment of the present invention will be explained with reference to drawings.

Figure 1:
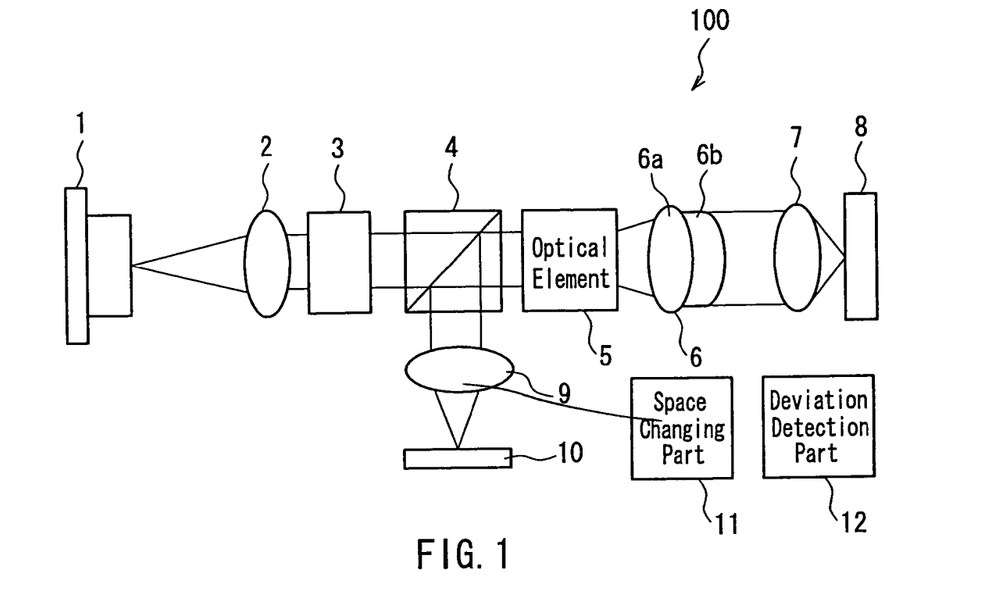
FIG. 1 is a block diagram showing a configuration of an optical head according to one embodiment of the present invention.

FIG. 1 is a block diagram showing a configuration of an optical head 100 of the embodiment of the present invention. The optical head 100 includes a light source 1. The light source 1 emits coherent light for recording and reproduction to a recording layer formed on the optical recording medium 8. The wavelength of the coherent light is 380 nanometers (nm) or more and 420 nanometers (nm) or less. The light source 1 is made of, for example, a GaN-based semiconductor laser element (wavelength: 405 nanometers (nm)).

The coherent light emitted from the light source 1 is converted into parallel light by a collimator lens 2 and then incident on a beam shaping optical element 3. The beam shaping optical element 3 expands light having a small divergence angle of the parallel light converted by the collimator lens 2 and allows light having a large divergence angle to pass as it is.

The parallel light passing through the collimator lens 2 passes through a beam splitter 4 having approximately 50% transmittance and 50% reflectance. The parallel light passing through the beam splitter 4 is incident on the optical element 5.

The rim intensity of the incident parallel light is changed by the optical element 5, further converted into diverged light, collimated into parallel light by a joined lens 6 and then converged on the optical recording medium 8 by an objective lens 7.

Next, light reflected by the optical recording medium 8 passes through the objective lens 7, passes through the joined lens 6 and the optical element 5, is reflected by the beam splitter 4, and then converged on a photodetector 10 by a converging lens 9. The photodetector 10 outputs a focus error signal indicating a focusing state of light on the optical recording medium 8 based on the converged light and furthermore, outputs a tracking signal indicating the irradiation position of the light. Herein, the focus error signal and tracking error signal are detected based on a known technology, for example, an astigmatism method and a push-pull method, etc.

A focus controller (not shown) controls the position of the objective lens 7 along the optical axis so that light always can be converged on the optical recording medium 8 based on the focus error signal in a state in which light is focused. Furthermore, a tracking controller (not shown) controls the position of the objective lens 7 so that light can be converged on the desired track on the optical recording medium 8 based on the tracking error signal. Furthermore, from the photodetector 10, information recorded in the optical recording medium 8 also is obtained.

Figure 2:
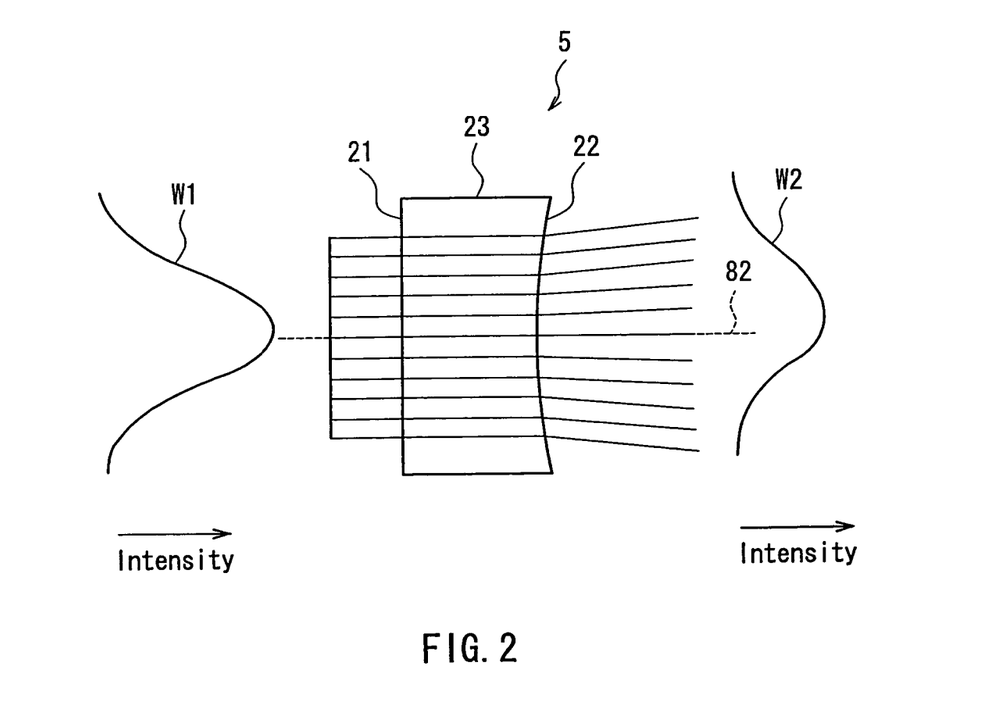
FIG. 2 is a view to explain the configuration of an optical element provided in the optical head according to the embodiment.

FIG. 2 is a view to explain a configuration of an optical element 5 provided in the optical head 100 of the embodiment. The optical element 5 includes a first curved surface 21 extending in the transverse direction with respect to a central axis 82, a second curved surface 22 extending in the transverse direction with respect to the central axis 82, and a peripheral surface 23 extending between the first curved surface 21 and the second curved surface 22 along the direction of the central axis 82. The optical element 5 allows the light collimated by the collimator lens 2 to diverge and further changes the rim intensity. The optical element 5 may be made of a transparent material having an isotropic refractive index (for example, glass).

The light incident on the first curved surface 21 diverges in one region of the first curved surface 21 and converges in another region of the first curved surface 21 due to the refraction at the first curved surface 21. Thereby, the incident light is emitted from the second curved surface 22 as diverged light in the Gaussian luminous intensity distribution W2 different from the Gaussian luminous intensity distribution W1 of the incident light.

The optical element 5 of the embodiment, unlike the optical element 90 mentioned above as a conventional technology, converts the incident light having a Gaussian luminous intensity distribution W1 into emitted light having a Gaussian luminous intensity distribution W2 in which the rim intensity is increased with respect to light in the range to be used in the optical system by the optical element 5.

Furthermore, when the rim intensity improvement rate (ratio of the rim intensity after being emitted from the optical element 4 with respect to the rim intensity before being incident in the optical element 4 of the embodiment) is 1.07 or less, the shape of the first curved surface 21 is in a shape of a concave lens unlike the shape of the optical element 90, and the concave lens effect is reduced toward the peripheral portion. In order to increase the rim intensity improvement rate, the shape of the peripheral portion is formed in a shape so as to provide the convex lens effect. As mentioned above, in the optical element 5 of the embodiment, the light flux density of the emitted light is increased toward the peripheral portion.

Figure 3:
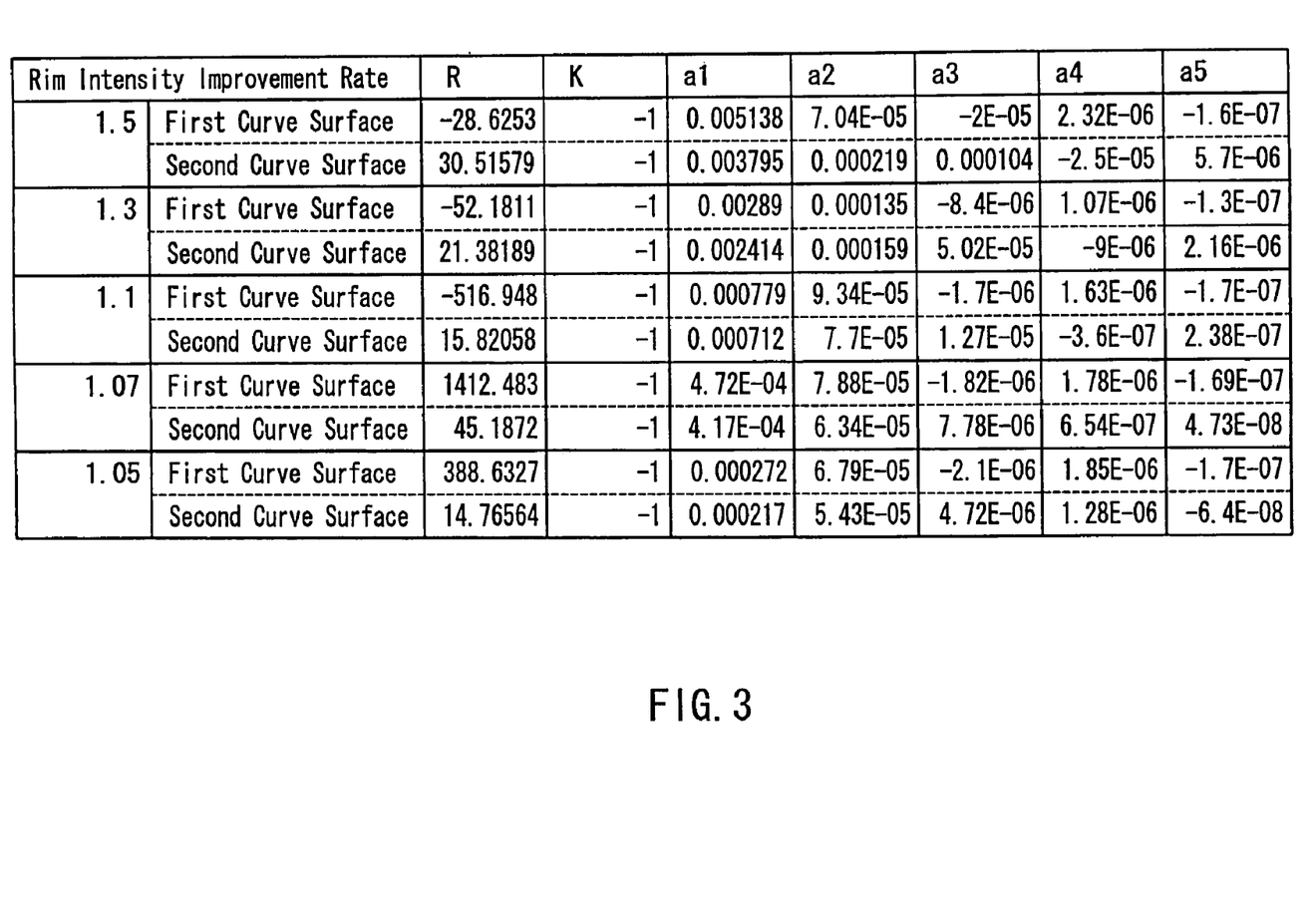
FIG. 3 is a view showing aspheric data of a first curved surface and a second curved surface of an optical element according to the embodiment.

FIG. 3 is a view showing aspheric data of an example of the first curved surface 21 and the second curved surface 22 of the optical element 5. Herein, the surface shape (hereinafter, referred to as "sag") of the lens constituting the optical lens 5 is represented by the following equation.

$$Z = (c \times r^2)/\left(1 + (1-(1+k) \times c2 \times r^2)^{1/2}\right) + \\ a1 \times r^2 + a2 \times r^4 + a3 \times r^6 + a4 \times r^8 + a5 \times r^{10}$$

wherein, c(=1/R): curvature
R: radius of curvature
k: conic constant
r: position of radius
Z: sag
a1–a8: aspheric coefficient (a1=0)

Figure 4A:
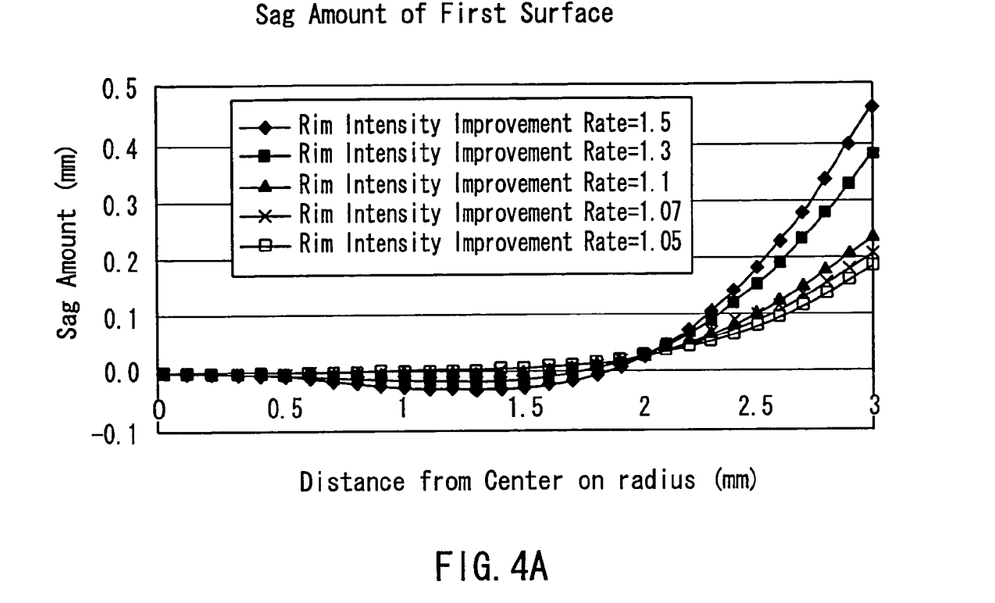
FIG. 4A is a graph showing the relationship between the sag amount of a first curved surface and a distance from the center in the optical element according to the embodiment.
Figure 4B:
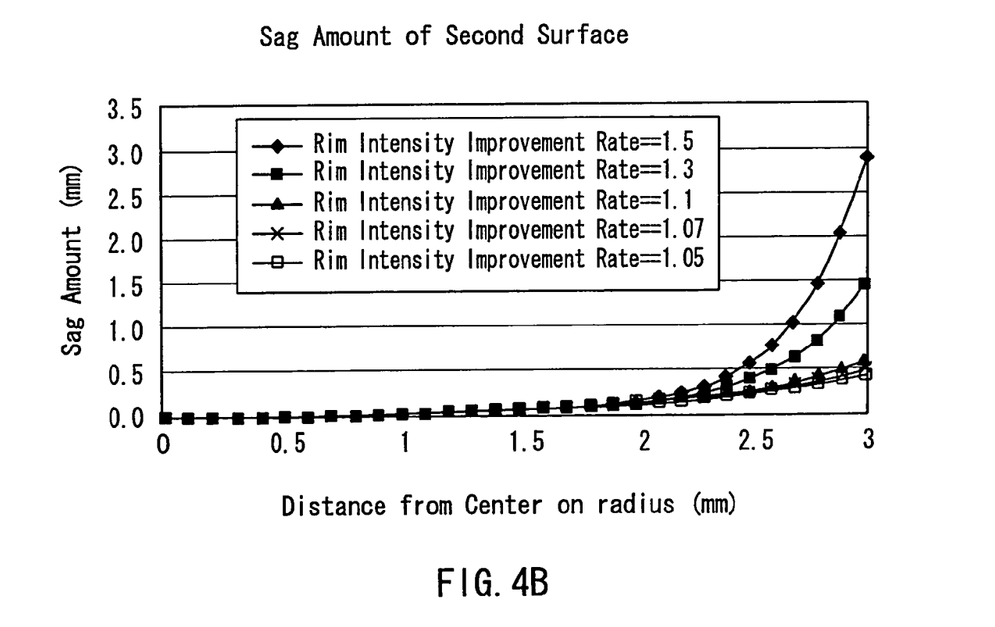
FIG. 4B is a graph showing the relationship between the sag amount of a second curved surface and a distance from the center in the optical element according to the embodiment.

The shape (sag) of the first curved surface 21 and the second curved surface 22 of the optical element 5 formed based on the aspheric data as shown in FIG. 3 are shown in FIG. 4A and FIG. 4B, respectively. FIG. 4A is a graph showing the relationship between the sag amount and the distance from the center in the first curved surface 21 of the optical element 100; and FIG. 4B is a graph showing the relationship between the sag amount and the distance from the center in the second curved surface 22.

As shown in FIG. 4A, when the rim intensity improvement rate is 1.5, 1.3 and 1.1, in the central portion near the axis line 82 of the first curved surface 21, a concave lens is formed and in the peripheral portion distant from the axis line 82 of the first curved surface 21, a convex lens is formed. Then, when the rim intensity improvement rate is 1.05 and 1.07, in the central portion and peripheral portion of the first curved surface 21, a concave lens is formed. Furthermore, as the rim intensity improvement rate becomes larger, the concave lens effect in the central portion is larger and the convex lens effect in the peripheral portion is larger in the first curved surface 21.

Figure 5:
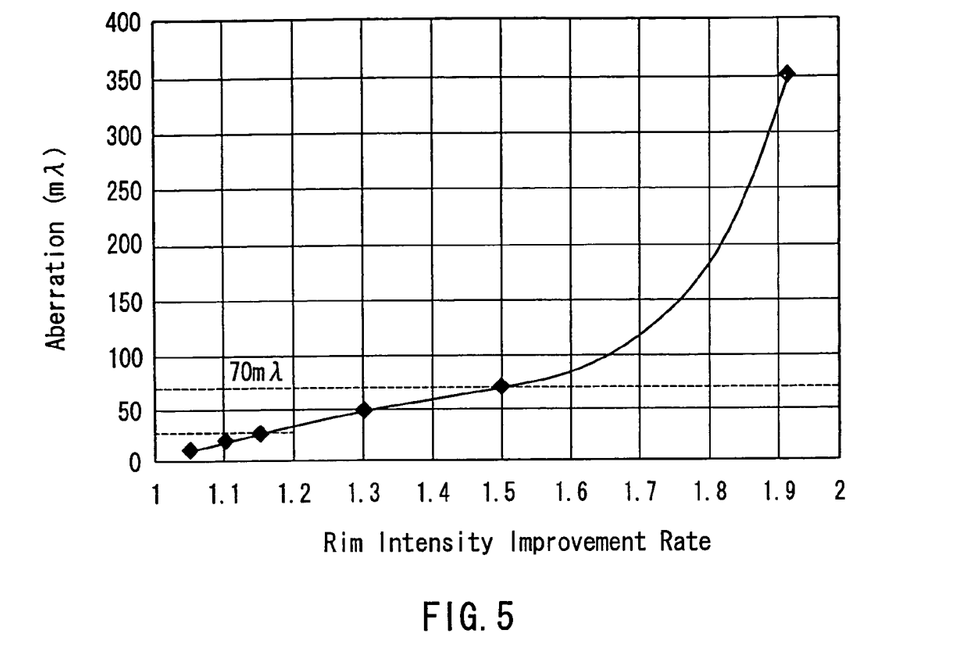
FIG. 5 is a graph showing the relationship between a rim intensity improvement rate and an aberration that occurs when the optical element tilts at an angle of 0.1° according to the embodiment.

FIG. 5 is a graph showing the relationship between the rim intensity improvement rate of the optical element 5 and an aberration that occurs when the optical element 5 tilts at an angle of 0.1°. Hereinafter, the relationship between the change amount of the rim intensity and the aberration for realizing this, which occurs when the optical element 5 tilts, will be explained. Herein, the conditions for calculating include: a divergence angle of the light source 1 is 25°, the focal distance of the collimator lens 2 taking light emitted from the light source 1 and collimating the light into parallel light is 6.7 millimeters (mm), a diameter of light incident on the optical element 5 is 2.84 millimeters (mm), and a space (central thickness) between the central position of the first curved surface 21 and the central position of the second curved surface 22 in the optical element 5 is 1.5 millimeters (mm). Under these conditions, the rim intensity corresponds to 52%.

Herein, the reason why the aberration at the tilting angle of 0.1° is considered is because the displacement in tilt may occur when the optical element 5 is mounted on the optical head 100 of the embodiment. Furthermore, in the case where the thickness of the central portion of the optical element 5 of the embodiment is 5 millimeters (mm) is also considered, the same results as in FIG. 3 was obtained. Therefore, it was found that the thickness of the central portion of the optical element 5 did not affect the tilt.

Herein, in order to converge light on the optical recording medium 8 with the objective lens 7, it is necessary to suppress an aberration to be 70 mλ or less. Therefore, as shown in FIG. 5, it is found that the rim intensity improvement rate of the optical element 5 of the embodiment is required to be 1.5 or less.

In the above embodiment, only the optical element 5 uses all of 70 mλ of aberration, which is the Marshall standard as to a stop performance of light. However, an optical head includes many other optical elements and all of such optical elements have aberrations caused by the error in manufacture and aberrations caused by the error in being mounted on an optical head. Therefore, it is realistic that 30 mλ or less of aberration is allocated to the tilt of the optical element 5. Therefore, as shown in FIG. 5, it is realistic and more preferable that the rim intensity improvement rate is 1.2 or less.

The relationship between this aberration and the rim intensity improvement rate was calculated with respect to the optical element 5 mentioned in the embodiment. However, substantially the same relationship is obtained in the case where parallel light is incident and parallel light is emitted. Herein, the position in which the rim intensity is calculated is at the end position of the diameter, which the diameter of light (this is determined by the NA and focal distance of the objective lens 7) incident in the objective lens 7 is projected onto the incident surface of the optical element 5, of the embodiment.

Figure 6:
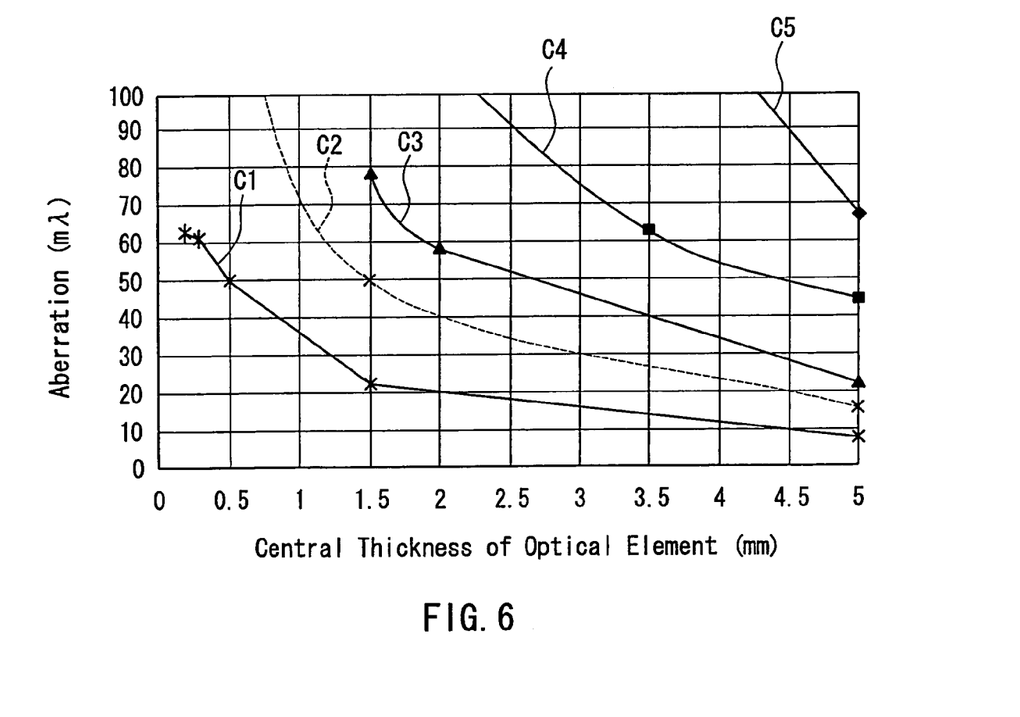
FIG. 6 is a graph showing the relationship between the central thickness of the optical element and the aberration that occurs when the first curved surface and the second curved surface are decentered by 5 micrometer (μm) according to the embodiment.

FIG. 6 is a graph showing the relationship between the central thickness of the optical element 5 and an aberration that occurs when the first curved surface 21 and the second curved surface 22 of the optical element 5 are decentered by 5 micrometers (μm). Hereinafter, the relationship between the central thickness of the optical element 5 and the decentering of the first curved surface 21 and the second curved surface 22 of the optical element 5 will be explained.

Herein, the reason why the aberration that occurs when 5 micrometers (μm) of decentering occurs is considered to be because 5 micrometers (μm) of decenter may occur due to the tolerance of die for molding, etc. when the optical element 5 is manufactured by molding. Herein, in order to converge light on the optical recording medium 8 with the objective lens 7, it is necessary to suppress an aberration to be 70 mλ or less.

Figure 7:
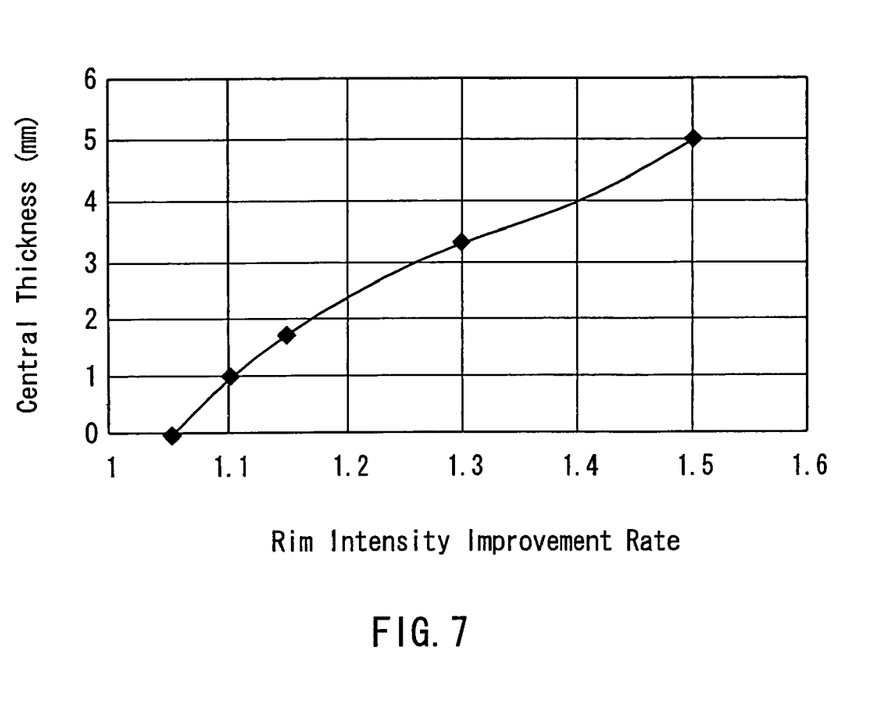
FIG. 7 is a graph showing the relationship between a rim intensity improvement rate and the central thickness when an aberration that occurs when the first curved surface and the second curved surface of the optical element are decentered by 5 μm becomes 70 mλ according to the embodiment.

Therefore, from FIG. 6, in each rim intensity improvement rate, the central thickness to make the aberration to be 70 mλ or less is obtained and the obtained central thickness is plotted so as to obtain a graph shown in FIG. 7. The curve C1 shows the relationship between the central thickness of the optical element 5 and the aberration when the rim intensity improvement rate is 1.05; the curve C2 shows the relationship when the rim intensity improvement rate is 1.1; the curve C3 shows the relationship when the rim intensity improvement rate is 1.15; the curve C4 shows the relationship when the rim intensity improvement rate is 1.3; and the curve C5 shows the relationship when the rim intensity improvement rate is 1.5.

FIG. 7 is a graph showing the relationship between the rim intensity improvement rate of the optical element 5 and the central thickness in the case where the aberration that occurs when the first curved surface 21 and the second curved surface 22 are decentered by 5 micrometers (μm) becomes 70 mλ.

From the relationship shown in FIG. 7, when the thickness of center of the optical element 5 of the embodiment is d millimeter (mm) and the rim intensity improvement rate is R and when the following relational expression is satisfied, the aberration can be made to be 70 mλ or less.

$$d \geq 54 \cdot R^4 - 221 \cdot R^3 + 304 \cdot R^2 - 138 \cdot R$$

This relationship shows a calculation as to the optical element 5 mentioned in the embodiment. However, substantially the same relationship can be obtained in the case where parallel light is incident and the parallel light is emitted.

Next, a glass material used for manufacturing the optical element 5 of the embodiment will be explained. Since the optical element 5 is used as a negative lens, if a glass material having a small Abbe constant (for example, a glass material having an Abbe constant of 45 or less) is used, this optical element 5 itself can have a chromatic aberration correction function. Furthermore, since the curved surface of the optical element 5 of the embodiment is an aspheric surface, the optical element 5 is required to be manufactured by molding. Therefore, a glass material capable of being molded (glass transition temperature: 600° C. or less) and having the small Abbe constant, for example, VC89 (product of SUMITA OPTICAL GLASS, INC.) (Abbe constant: 40.8) is preferably used for manufacturing the optical element 5.

Next, the necessary amount of the rim intensity improvement rate will be explained. In the optical head 100, in order to achieve the stable tracking error signal, the rim intensity is required to be 60% or more. In order to secure this rim intensity, the use amount (capture efficiency) of light emitted from the light source 1 is required to be 40% or less (in the case of light having the Gaussian luminous intensity distribution, the use amount of light is a value obtained by subtracting the rim intensity from 100%). Furthermore, many optical components are mounted on the optical head 100 and if the loss of reflection, etc. by them is considered, light emitted from the objective lens 7 further becomes about 80%. Therefore, in order to make the rim intensity to be 60%, only about 30% of light emitted from the light source 1 can be used.

Herein, when 15 milli Watt (mW) as a light amount is required in order to record signals onto the recording layer formed on the optical recording medium 8, a light source capable of outputting at least 50 milli Watt (mW) or more of light is required as the light source 1. However, since the output of blue semiconductor lasers available at the present time is 45 milli Watt (mW) at maximum, it is necessary to increase the capture efficiency from 40% to 44% while securing 60% of rim intensity. In other word, it is necessary to improve the rim intensity from 56% to 60 in a state in which the capture efficiency is maintained at 40% to 44%. That is, it is desirable that the rim intensity improvement rate is 1.07 or more.

Furthermore, as mentioned above, the rim intensity improvement rate is required to be 1.07 or more. However, unless some tolerance is included, it is not possible to be treated in the case where light emitted from the objective lens is reduced from the initial state due to presence of dust on the objective lens 7. Therefore, it is preferable that the rim intensity improvement rate is 1.1 or more with some tolerance taken into account.

Light passing through the optical element 5 of the embodiment is converted into parallel light by the joined lens 6. The joined lens 6 also has a function for correcting a chromatic aberration that occurs when the wavelength of the light source 1 is changed at the time the reproducing operation is switched to the recording operation.

When the reproducing operation is switched to the recording operation, the amount of light emitted from the light source 1 is changed. At this time, since the wavelength is changed quickly, the light that is converged on the optical recording medium 8 by the objective lens 7 is defocused, and thus the spherical aberration occurs. That is, a chromatic aberration occurs. Such a defocus occurs so quickly as not to be suppressed by allowing a focus control to follow. Also, the spherical aberration occurs so quickly as not to be suppressed by allowing a spherical aberration correction means to follow. Therefore, it is necessary to correct the chromatic aberration by an optical system.

Therefore, in order to provide a positive lens group of the spherical aberration correction means with a chromatic aberration correction function, a positive lens group is configured by the joined lens 6. Herein, a convex lens portion 6a of the joined lens 6 is made of a glass material having a large Abbe constant (for example, 50 or more) and a concave portion 6b of the joined lens 6 is made of a glass having a small Abbe constant (for example, 30 or less).

Since the refractive index changes quickly as the wavelength becomes shorter, the amount of occurred chromatic aberrations is increased. Herein, when an objective lens 7 having the wavelength of 405 nanometers (nm) and NA of 0.85 is designed as a single lens, about 0.35 micrometers ($\mu$m) per nanometer (nm) of defocus occurs. In order to correct this defocus, the convex lens portion 6a is made of a glass material having the Abbe constant of 55.4 and the concave lens portion 6b is made of a glass material having the Abbe constant of 25.5, thereby enabling the above-mentioned chromatic aberration to be corrected. Furthermore, unless the refractive index of the glass material having small Abbe constant is made 1.7 or more, the radius of curvature of the lens becomes small and thus the tolerance in manufacturing lens becomes strict.

In this embodiment, since the positive lens group constituting the spherical aberration correction means is provided with a function for correcting a chromatic aberration, it is not necessary to provide an additional chromatic aberration correction element, and thus the optical system can be simplified and the optical head can be miniaturized.

Next, a spherical aberration correction means will be explained. The spherical aberration correction means includes the joined lens 6, the optical element 5 and a space changing part 11 for changing a space between the joined lens 6 and the optical element 5 in order to correct the spherical aberration. The spherical aberration correction means may be an expanding system (a system in which incident parallel light is emitted as an expanded parallel light). This will be explained hereinafter. The optical head 100 is provided with a deviation detection part 12 for detecting a deviation of the thickness of a base material of the optical recording medium 8 from the standard value. The method for correcting a spherical aberration that occurs when the thickness of the optical recording medium 8 is deviated from the standard value includes changing a space between a positive lens group and the negative lens group. Herein, as the effective diameter of the objective lens 7, since the aperture (NA) is constant, the projected diameter to the objective lens 7 of light incident in the spherical aberration correction means (hereinafter, referred to as "objective lens projected diameter") changes. This change amount corresponds to the change in the rim intensity, and therefore a large change is not preferred.

Herein, if the spherical aberration correction means is configured by a reducing system, the diameter projected on the objective lens of light incident in the spherical aberration correction means changes largely. On the other hand, in an expanding system, since the change amount becomes small, therefore it is desirable to use an expanding system.

Furthermore, as mentioned above, in order to correct the spherical aberration, it is necessary to change a space between lenses by the space changing part 11. However, if lenses are moved, lenses may tilt. Herein, since the optical element 5 of the embodiment is sensitive to the tilt, in correcting the spherical aberration it is advantageous to move the joined lens 6 by the space changing part 11 without moving the optical element 5. Furthermore, if similar lenses are moved, since the diameter of light incident on the lens that is distant from the light source 1 is changed, it is preferable that the optical element 5 of the embodiment having a function for correcting the rim intensity is arranged at the side of the light source 1. Needless to say, it is possible to be configured in which a lens having an achromatizing function is a negative lens group, an optical element 5 of the embodiment is a positive lens group, and the side movable at the time of correcting the spherical aberration is a negative lens group.

A method for correcting a spherical aberration of the embodiment will be explained. First of all, a deviation of the thickness of a base material of the optical recording medium 8 from the standard value is detected by a deviation detection part 12. In this detection method, detection can be carried out before recording or reproducing with respect to the recording medium 8 based on a predetermined learning method. Furthermore, another detection method is disclosed in JP2000-171346A. This other detection method detects a spherical aberration based on the two focus positions of a first light beam located near the optical axis and a second light beam located on an outer side from the first light beam.

Furthermore, JP10-334575A describes a further detection method. Specifically, in an apparatus for the detection method, a configuration includes a light source, a first optical system for irradiating an optical recording medium (subject to be measured) with light emitted from the light source, and a second optical system for leading a reflected light from the optical recording medium to the light receiving element. Herein, the light source may include a laser, LED or a lamp. The first and second optical systems may include a convex lens or a combination of a convex lens and a concave lens.

With the use of this configuration, signals output from the light-receiving element are different depending upon the thickness of a base material, and signals with respect to the thickness of the base material are obtained. When the deviation detection part 12 detects the deviation of the thickness of the base material from the standard value by learning, it is possible to correct the spherical aberration by moving only either one of the lenses by the space changing part 11 by a necessary amount because a space between the optical element 5 and the joined lens 6 of the embodiment, which is necessary to correct the spherical aberration that occurs when the thickness of the base material is deviated from the standard value, is determined in design.

Furthermore, in the case where the signal about the thickness of the base material is obtained, the space between the optical element 5 and the joined lens 6 of the embodiment may be changed by the space changing part 11 so that the above-obtained signal becomes a signal obtained when the thickness of the base material is the standard value.

Herein, in order to change the space between lenses, either the optical element 5 or the joined lens 6 of the embodiment is moved by the space change mans 11. However, for the reason mentioned above, it is preferable to move not the optical element 5 but the joined lens 6 by the space changing part 11.

Next, the position of the optical element 5 provided with a rim intensity improving function will be explained. In the optical head 100 for recording, it is desirable that light that converges on the optical recording medium 8 is made to have as uniform a rim intensity as possible. However, since the divergence angle of the direction of light emitted from the light source 1 is different between the direction parallel to the edge face of the light source 1 and the direction perpendicular to the edge face of the light source 1, the rim intensity of light that converges on the optical recording medium 8 is non-uniform. Therefore, the optical head 100 of the embodiment is provided with a beam shaping optical element 3, which diverges light with a small divergence angle of the light source 1 and allows the light with a large divergence angle to pass as it is, thus making the rim intensity uniform. In the case where the optical element 5 is located nearer to the light source side than the beam shaping optical element 3, it can be carried out by changing the rim intensity improvement rate between the direction in which light is expanded by the beam shaping optical element 3 and the direction in which light is allowed to pass as it is.

As mentioned above, by restricting the rim intensity improvement rate and the central thickness of the optical element 5 having the rim intensity improving function, it is possible to improve the yield of the optical element. Furthermore, when the optical element 5 of the embodiment is mounted on the optical head 100 in order to configure the optical head 100 in which the rim intensity is improved, by adding the above-mentioned limitation, the yield in fabrication of the optical head is improved and the reliability is improved. Furthermore, since the spherical aberration correction means is configured by using the optical element 5 having the rim intensity improving function, the optical head 100 can be simplified and miniaturized. Furthermore, since the spherical aberration correction means has also the chromatic aberration correction function, the optical head can be simplified and miniaturized further.

However, in this case, since it is necessary to change the rim intensity improvement rate between in the direction in which light is expanded by the beam shaping optical element 3 and the direction in which light is allowed to pass as it is, the shapes of the first curved surface 21 and the second curved surface 22 are not rotational symmetrical with respect to the center. When such an optical element 5 is manufactured, it is necessary to adjust the rotational displacement between the first curved surface 21 and the second curved surface 22 with high accuracy. In the molding process, it is difficult to eliminate the rotational displacement between the first curved surface 21 and the second curved surface 22. Consequently, the yield of the optical elements is reduced.

On the other hand, in the optical element 5 having the rim intensity improving function, which is placed between the beam shaping optical element 3 and the objective lens 7, since it is not necessary to change the rim intensity improvement rate between in the direction in which light is expanded by the beam shaping optical element 3 and the direction in which light is allowed to pass as it is, the above-mentioned limitation is not present. Thus, it becomes easy to manufacture the optical element 5. Therefore, in the optical head 100 of the embodiment, a spherical aberration correction means is configured by using the optical element 5 of the embodiment.

As mentioned above, according to the embodiment, a rim intensity improvement rate R, which is a ratio of the rim intensity of incident light to the rim intensity of emitted light is 1.07 or more and 1.5 or less. The rim intensity represents a ratio of the central intensity to the peripheral intensity. Therefore, an aberration that occurs when the optical element tilts and an aberration that occurs when the first curved surface 21 and the second curved surface 22 are decentered can be suppressed to 70 m$\lambda$ or less. As a result, the yield of the optical element 5 is improved and when it is mounted on the optical head 100, the yield of the optical head 100 is improved and the reliability is improved.

Figure 8:
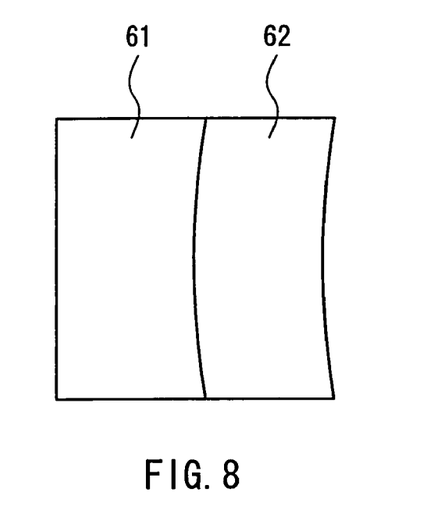
FIG. 8 is a view to explain a configuration of another optical element according to the embodiment.

Note here that in the embodiment, an example in which the rim intensity improving function and the chromatic aberration correction function are carried out by separate lenses was mentioned. However, the present invention is not limited to this. As shown in FIG. 8, a lens in which the rim intensity converting part and the chromatic aberration correction part are integrated may be employed. The lens shown in FIG. 8 includes a lens 61 formed for changing the rim intensity and a lens 62 formed of a glass material having the Abbe constant different from that of a glass material for the lens 61.

The optical element 5 of the embodiment may be manufactured by joining the lens 61 and the lens 62. This optical element 5 is used for the spherical aberration correction means as a negative lens group, and the positive lens group may be formed as a simple planoconvex lens. As the spherical aberration is corrected by moving this planoconvex lens, the weight of the movable part is reduced. Therefore, a mechanism part for moving a lens can be simplified and the amount of electric current for moving the lens can be small and thus energy can be saved.

Furthermore, in the embodiment, as the chromatic aberration correction means, the joined lens 6 in which lenses having different Abbe constants are joined was mentioned as an example. However, the present invention is not limited to this. The joined lens 6 may be diffractive lens. In this case, since the weight of the movable part is reduced, a mechanism for moving the diffractive lens can be simplified. Furthermore, the amount of electric current for moving the diffractive lens can be small and thus energy can be saved.

Furthermore, in the embodiment, since a semiconductor laser is used for the light source 1, the wavelength changes in switching between recording operation and reproducing operation, and therefore, a chromatic aberration correction system is required. However, if a second harmonics generation blue laser (SHG light source) including a near infrared semiconductor laser and a quasi-phase matching type polarization inversion waveguide device is used for the light source 1, since the wavelength does not change, a chromatic aberration correction means is not necessary, thus enabling the optical head to be simplified.

Furthermore, in the embodiment, for the objective lens 7, a single lens is used. However, a pair lens having the high NA may be used.

Furthermore, in the embodiment, the example in which the infinite system optical head is used was explained. However, a finite system optical head without using a collimator lens may be used.

Furthermore, in the embodiment, the example in which an unpolarized type optical system optical head is used was explained. However, a polarized type optical head in which the above-mentioned optical head is further provided with a quarter wavelength plate and a beam splitter as a polarization beam splitter, may be used.

Furthermore, the embodiment described an example in which a beam shaping optical element 3 is provided. Needless to say, the optical element according to the present invention is effective also in the optical head that is not provided with the beam shaping optical element 3.

Furthermore, in the embodiment, the spherical aberration correction means is configured by the optical element 5 having the rim intensity improving function. However, there is no problem even in the case where the optical element 5 having the above-mentioned limitation and the spherical aberration correction means are mounted on the optical head separately.

Furthermore, in this case, the spherical aberration correction means is configured by, for example, the joined lens that is a chromatic aberration correction element and one concave lens. In this case, it is advantageous that a spherical aberration is corrected by moving a lens other than the joined lens. The reason therefor will be mentioned below.

The spherical aberration can be corrected by changing a space between lenses by moving one of the lenses. Furthermore, since the thickness of the optical recording medium changes also in one track, it is necessary to move the lens so as to follow the change in the thickness in one track. Therefore, the weight of the lens is desirably light from the viewpoint of controlling. Furthermore, due to a signal for moving lens, which is applied from the outside, the temperature of the movable part is increased. Herein, since, lenses are adhered with a UV curing resin in the joined lens, if the temperature is increased, the aberration of the joined lens itself is deteriorated, thus deteriorating the property of the optical head. For such reasons, in the case where the spherical aberration correction means is configured without using the rim intensity correction element, the lens other than joined lens had better be moved.

Figure 9:
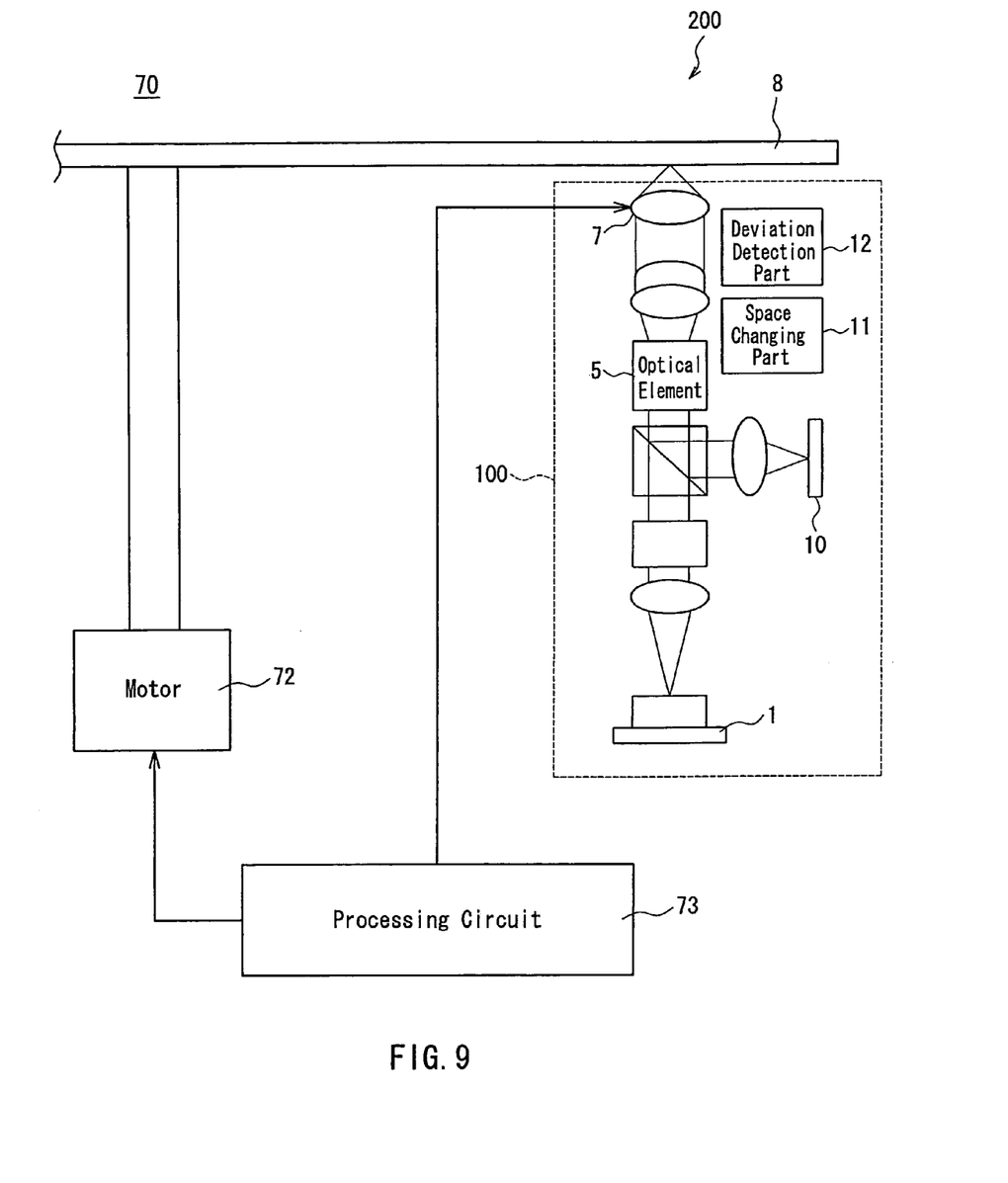
FIG. 9 is a block diagram showing a configuration of an optical recording/reproducing apparatus provided with an optical head according the embodiment.

FIG. 9 is a block diagram showing a configuration of an optical recording/reproducing apparatus 200 including an optical head 100 according to the embodiment. To the same component elements as those in the optical head 100 explained with reference to FIG. 1, the same reference numbers are given and the detail explanations therefor are omitted herein.

The optical recording/reproducing apparatus 200 includes an optical head 100, a motor 72 provided for rotating an optical recording medium 8, and a processing circuit 73 provided for controlling the position of the objective lens 7 provided in the optical head 100 so that light is converged on a desirable track on the optical recording medium 8 based on a focus error signal and tracking error signal produced by the optical head 100.

The operation of thus configured optical recording/reproducing apparatus 200 will be explained. First of all, when the optical recording medium 8 is set in the optical recording/reproducing apparatus 200, a processing circuit 73 outputs a signal for rotating a motor 72 so as to rotate the motor 72. Next, the processing circuit 73 drives the light source 1 provided in the optical head 100 so as to emit light. Then, light emitted from the light source 1 is reflected by the optical recording medium 8 and incident on a photodetector 10 provided in the optical head 100. The photodetector 10 outputs a focus error signal indicating the state in which light is focused on the optical recording medium 8 and a tracking error signal indicating the position on which light is irradiated to the processing circuit 73. Based on these signals, the processing circuit 73 outputs a signal for controlling the position of the objective lens 7, thereby allowing the light emitted from the light source 1 to be converged on the desirable track on the recording medium 8. Furthermore, the processing circuit 73 reproduces information recorded in the optical recording medium 8 based on the signals output from the photodetector 10.

As mentioned above, since the optical recording/reproducing apparatus 200 includes the optical head 100 of the embodiment, the tracking error signal becomes stable. Therefore, it is possible to obtain an optical recording/reproducing apparatus 200 having high reliability capable of recording/reproducing information in/from the optical recording medium 8. Furthermore, since the optical head 100 suitably can be miniaturized, the optical recording/reproducing apparatus 200 also can be miniaturized.

As mentioned above, although the embodiment of the present invention was explained with some examples given, the present invention is not necessarily limited to the above-mentioned embodiment and the present invention can be applied to the other embodiment based on the technical idea of the present invention.

Furthermore, in the above-mentioned embodiment, an optical recording medium for recording information only by light was mentioned. However, needless to say, the same effect can be obtained in a magneto-optical recording medium for recording information with light and a magnetic substance.

Furthermore, the above-mentioned embodiment described the case where the optical recording medium is an optical disk. However, it can be applied to an optical information recording/reproducing apparatus that realizes the similar function, for example, a card type optical recording medium, etc.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An optical element comprising:
   a central axis;
   a first surface extending in a transverse direction with respect to the central axis;
   a second surface extending in the transverse direction with respect to the central axis; and
   a peripheral surface extending between the first surface and the second surface;
   wherein light is refracted from the time when light is incident on the first surface to the time when the light is emitted from the second surface, and thereby a light intensity distribution of the light emitted from the second surface and a light intensity distribution of the light incident on the first surface are different from each other, and
   a rim intensity improvement rate R, which is a ratio of rim intensity of the emitted light with respect to rim intensity of the incident light is 1.07 or more and 1.5 or less, in which rim intensity represents a ratio of the central intensity to the peripheral intensity.

2. The optical element according to claim 1, wherein when a distance (central thickness) between the central position of the first surface and the central position of the second surface is d (mm), d satisfies the following relationship:

$d \geq 54 \cdot R^4 - 221 \cdot R^3 + 304 \cdot R^2 - 138 \cdot R.$

3. An optical head for recording or reproducing a signal with respect to an optical recording medium, the optical head comprising:
   a light source for emitting light; and
   an objective lens for converging the light emitted from the light source on the optical recording medium;
   wherein the optical element according to claim 1 is disposed between the light source and the objective lens.

4. The optical head according to claim 3, further comprising a spherical aberration correction means provided for correcting a spherical aberration that occurs due to a deviation of the thickness of a base material of the optical recording medium from the standard value.

5. The optical head according to claim 4, further comprising a lens disposed at a predetermined space with respect to the optical element, wherein the sperical aberration correction means comprises the lens, the optical element and a space changing means for changing a space between the optical element and the lens in order to correct the spherical aberration.

6. The optical head according to claim 5, wherein the lens converts light diverged by the optical element into parallel light.

7. The optical head according to claim 3, further comprising a beam shaping optical element disposed between the optical element and the light source for beam-shaping of the light emitted from the light source.

8. The optical head according to claim 3, wherein when a distance (central thickness) between the central position of the first surface and the central position of the second surface is d (mm), d satisfies the following relationship:

$d \geq 54 \cdot R^4 - 221 \cdot R^3 + 304 \cdot R^2 - 138 \cdot R.$

9. The optical head according to claim 5, wherein the lens comprises a convex lens disposed at the side of the optical element and a concave lens disposed at the side of the objective lens and having an Abbe constant that is smaller than an Abbe constant of the convex lens.

10. The optical head according to claim 4, wherein the spherical aberration correction means is an expanding system.

11. The optical head according to claim 4, wherein the spherical aberration correction means has a chromatic aberration correction function.

12. The optical head according to claim 5, wherein at least one of the optical element and the lens has a chromatic aberration correction function.

13. The optical head according to claim 4, wherein the spherical aberration correction means comprises the optical element, a diffractive lens disposed at a predetermined space with respect to the optical element, and a space changing means for changing a space between the optical element and the diffractive lens in order to correct the spherical aberration.

14. The optical head according to claim 13, wherein the diffractive lens converts light diverged by the optical element into parallel light.

15. The optical head according to claim 3, further comprising a chromatic aberration correction element having a chromatic aberration correction function.

16. The optical head according to claim 3, wherein the NA of the objective lens is 0.7 or more.

17. The optical head according to claim 3, wherein the wavelength of the light emitted from the light source is 380 nanometers (nm) or more and 420 nanometers (nm) or less.

18. The optical head according to claim 4, further comprising: a deviation detector for detecting a deviation of the thickness of a base material of the optical recording medium from the standard value.

19. The optical head according to claim 4, further comprising:
   a lens disposed at a predetermined space with respect to the optical element; and
   a deviation detection means for detecting a deviation of the thickness of a base material of the optical recording medium from the standard value;
   wherein the spherical aberration correction means comprises the lens, the optical element and a space changing means for changing a space between the lens and the optical element in order to correct the spherical aberration based on the detected deviation of the base material.

20. A method for correcting a spherical aberration, which uses an optical head according to claim 5, the method comprising:
   detecting a deviation of the thickness of a base material of the optical recording medium from the standard value; and
   changing a space between the optical element and the lens in order to correct the spherical aberration based on the detected deviation of the base material.

21. The method for correcting a spherical aberration according to claim 20, wherein in the changing a space, the lens is moved in order to change a space between the optical element and the lens.

22. An optical recording/reproducing apparatus comprising:
   an optical head according to claim 3; and
   a processing circuit provided for controlling the position of the objective lens provided in the optical head so that the light is converged on a desirable track on the optical recording medium based on a focus error signal and a tracking error signal produced by the optical head.

* * * * *